(12) United States Patent
Jeong et al.

(10) Patent No.: US 12,540,762 B2
(45) Date of Patent: Feb. 3, 2026

(54) REFRIGERANT MODULE FOR A VEHICLE

(71) Applicants: HYUNDAI MOTOR COMPANY, Seoul (KR); KIA CORPORATION, Seoul (KR); DOOWON CLIMATE CONTROL CO., LTD., Asan-si (KR)

(72) Inventors: Seong-Bin Jeong, Hwaseong-si (KR); Dong Seok Oh, Hwaseong-si (KR); Wan Je Cho, Hwaseong-si (KR); Woojin Lee, Seoul (KR); Jae-Eun Jeong, Hwaseong-si (KR); Yong Woong Cha, Yongin-si (KR); DongJu Ko, Hwaseong-si (KR); Shin Ryu, Cheonan-si (KR); Kyoung Tai Park, Cheonan-si (KR)

(73) Assignees: HYUNDAI MOTOR COMPANY, Seoul (KR); KIA CORPORATION, Seoul (KR); DOOWON CLIMATE CONTROL CO., LTD., Asan-si (KR)

( * ) Notice: Subject to any disclaimer, the term of this patent is extended or adjusted under 35 U.S.C. 154(b) by 189 days.

(21) Appl. No.: 18/387,760

(22) Filed: Nov. 7, 2023

(65) Prior Publication Data
US 2025/0035350 A1    Jan. 30, 2025

(30) Foreign Application Priority Data

Jul. 28, 2023  (KR) .......... 10-2023-0098633

(51) Int. Cl.
*F25B 41/20* (2021.01)
*F25B 39/00* (2006.01)

(52) U.S. Cl.
CPC .............. *F25B 41/20* (2021.01); *F25B 39/00* (2013.01)

(58) Field of Classification Search
CPC .......... F25B 41/20; F25B 39/00; F25B 41/31; B60H 1/3229; B60H 1/32284
See application file for complete search history.

(56) References Cited

U.S. PATENT DOCUMENTS

2025/0155043 A1*  5/2025  Woo .................... F16K 11/0876

FOREIGN PATENT DOCUMENTS

| WO | WO-2024085545 A1 * | 4/2024 | ........... B60H 1/3229 |
| WO | WO-2024096550 A1 * | 5/2024 | ............... B60H 1/32 |

OTHER PUBLICATIONS

WO-2024085545-A1 translation.*
WO-2024096550-A1 translation.*

* cited by examiner

*Primary Examiner* — Elizabeth J Martin
(74) *Attorney, Agent, or Firm* — Lempia Summerfield Katz LLC

(57) ABSTRACT

A refrigerant module for a vehicle includes: a heat exchanger for exchanging heat between a refrigerant introduced therein and a working fluid; a valve manifold connected to the heat exchanger and having a refrigerant flow path formed inside to supply the refrigerant to the heat exchanger or to bypass the refrigerant; and a plurality of valve assemblies mounted on the valve manifold to control a flow of the refrigerant flowing in the refrigerant flow path.

11 Claims, 10 Drawing Sheets

REFRIGERANT MODULE FOR A VEHICLE

CROSS-REFERENCE TO RELATED APPLICATION

This application claims priority to and the benefit of Korean Patent Application No. 10-2023-0098633 filed in the Korean Intellectual Property Office on Jul. 28, 2023, the entire contents of which are incorporated herein by reference.

BACKGROUND

(a) Field of the Disclosure

The present disclosure relates to a refrigerant module for a vehicle. More particularly, the present disclosure relates to a refrigerant module integrally combining a plurality of valve assemblies and a heat exchanger so that the refrigerant module is simple to assemble with a reduced number of parts and is easy to maintain.

(b) Description of the Related Art

Generally, an air conditioning system for a vehicle includes an air conditioning device that circulates a refrigerant to heat or cool the interior of the vehicle.

Such an air conditioning device is used to maintain a comfortable indoor environment by maintaining the indoor temperature of the vehicle at an appropriate temperature, regardless of changes in external temperature. Such a device is configured to heat or cool the interior of the vehicle by heat exchange between a condenser and an evaporator in a process where a refrigerant, discharged by driving a compressor, circulates back to the compressor through the condenser, a receiver dryer, an expansion valve, and the evaporator.

In other words, when the air conditioning device is in a cooling mode in the summer, a high-temperature and high-pressure gaseous refrigerant compressed from the compressor is condensed through the condenser. Then the refrigerant is evaporated by the evaporator after passing through the receiver dryer and the expansion valve to lower the indoor temperature and humidity.

Meanwhile, with a recent growing interest in energy efficiency and environmental pollution issues, there has been a demand for developing eco-friendly vehicles that can substantially replace internal combustion engine vehicles. These eco-friendly vehicles are usually classified as electric vehicles driven by fuel cells or electricity as their power sources and hybrid vehicles driven by engines and batteries.

Among these eco-friendly vehicles, an electric vehicle or a hybrid vehicle does not use a separate heater, unlike an air conditioning system of a typical vehicle. The air conditioning device applied to the eco-friendly vehicle is usually referred to as a heat pump system.

Meanwhile, in an electric vehicle driven using a fuel cell as a power source, energy generated by a chemical reaction between oxygen and hydrogen is converted into electrical energy to generate driving force. In this process, since the thermal energy is generated by the chemical reaction within the fuel cell, it is essential to effectively remove the generated heat to ensure the performance of the fuel cell.

In addition, in a hybrid vehicle, the driving force is generated by driving a motor using electricity supplied from the fuel cell or the battery together with an engine that is operated with a fuel, such as a petroleum-based fuel. Therefore, it is necessary to effectively remove heat generated from the fuel cell, the battery, and the motor to secure the performance of the motor.

Accordingly, in a hybrid vehicle or an electric vehicle according to the prior art, it is necessary to configure a cooling device for preventing heat generation in a motor and electrical components and a battery cooling device for preventing heat generation in a battery including a fuel cell as separate sealed circuits.

Therefore, there are drawbacks in that a cooling module disposed at the front of the vehicle has an increased size and weight. Also, the layout of connection pipes for supplying a refrigerant or a coolant to each heat pump system and a cooling device inside an engine compartment and to a battery cooling device is complicated.

The above information disclosed in this Background section is only for enhancement of understanding of the background of the disclosure, and may include information that does not form the prior art that is already known to those having ordinary knowledge in the art.

SUMMARY

In order to prevent the above-described drawbacks, there is a need for developing a refrigerant module in which a heat exchanger and a valve for controlling a flow direction of a refrigerant are integrally formed.

The present disclosure provides a refrigerant module for a vehicle integrally combining a plurality of valve assemblies and a heat exchanger so that the refrigerant module is simple to assemble with a reduced number of parts and is easy to maintain.

An embodiment of the present disclosure provides a refrigerant module for a vehicle. The refrigerant module includes: a heat exchanger configured to exchange heat between a refrigerant introduced therein and a working fluid; a valve manifold connected to the heat exchanger and having a refrigerant flow path formed inside the valve manifold to supply the refrigerant to the heat exchanger or to bypass the refrigerant; and a plurality of valve assemblies mounted on the valve manifold to control a flow of the refrigerant flowing in the refrigerant flow path.

The valve manifold may include: a first body with a first flow path provided therein; a first mounting groove communicating with the first flow path and provided in the first body so that one of the valve assemblies is mounted therein; a second body with a second flow path provided therein; a second mounting groove communicating with the second flow path and provided in the second body so that another one of the valve assemblies is mounted therein; and a connection portion disposed between the first body and the second body to connect the first body and the second body to each other and having a third flow path provided therein.

The refrigerant flow path may be formed by the first flow path, the second flow path, and the third flow path connected to each other inside the first body, the second body, and the connection portion.

The valve manifold may further include a plurality of refrigerant holes each communicating with the first mounting groove or the second mounting groove. The plurality of refrigerant holes may be provided in the first body, the second body, or the connection portion so that the refrigerant is introduced or discharged.

The plurality of refrigerant holes may include a first refrigerant hole communicating with the first mounting groove through the first flow path and provided in the first body toward the heat exchanger. The plurality of refrigerant holes may also include a second refrigerant hole communicating with the first mounting groove through the first flow path, provided in the first body toward a direction opposite to the second body, and disposed in a direction perpendicular to the first refrigerant hole. The plurality of refrigerant holes may also include a third refrigerant hole communicating with the second mounting groove through the second flow path and provided to be perpendicular to each of the first refrigerant hole and the second refrigerant hole in the second body. The plurality of refrigerant holes may also include a fourth refrigerant hole formed in the second body to be disposed on the same line as the third refrigerant hole and a fifth refrigerant hole formed in the connection portion in the same direction as the third refrigerant hole.

The first refrigerant hole may be connected to the heat exchanger.

The refrigerant supplied to the valve manifold may be selectively introduced into the second refrigerant hole or the fifth refrigerant hole.

The first body, the second body, and the connection portion may be integrally formed.

The valve assembly may include: an actuator generating rotational power by applying a control signal thereto; a shaft with one end coupled to the actuator to receive the rotational power transmitted from the actuator; a ball coupled to the other end of the shaft and rotated by the rotational power of the actuator; and a seat housing rotatably accommodating the ball and coupled to the actuator.

The seat housing may have a diameter that gradually decreases toward the valve manifold from the actuator.

The ball may include an inlet passage selectively communicating with the refrigerant flow path and allowing the refrigerant to be introduced therethrough. The ball may also include an outlet passage communicating with the inlet passage and allowing the refrigerant introduced into the inlet passage to be discharged therethrough.

The refrigerant module may further include a bracket to which the heat exchanger and the valve manifold are fixed.

A sealing member may be interposed between the valve manifold and each of the valve assemblies.

As described above, the refrigerant module for the vehicle according to an embodiment of the present disclosure is simple to assemble with a reduced number of parts, and is easy to maintain, by integrally forming the plurality of valve assemblies with the heat exchanger using the valve manifold.

In addition, according to the present disclosure, by mounting the plurality of valve assemblies using the valve manifold mounted on the heat exchanger and including the refrigerant flow path inside, it is possible to prevent a leakage of the refrigerant while minimizing the sealing member, thereby improving overall marketability.

In addition, according to the present disclosure, since the refrigerant flow path formed in the valve manifold is not sharply bent, it is possible to reduce a passage resistance, and it is possible to minimize the use of connecting pipes.

Furthermore, according to the present disclosure, by promoting simplification and modularization of components, it is possible to reduce the manufacturing cost and reduce the weight, and it is possible to improve the space utilization.

DETAILED DESCRIPTION OF THE EMBODIMENTS

Figure 1:
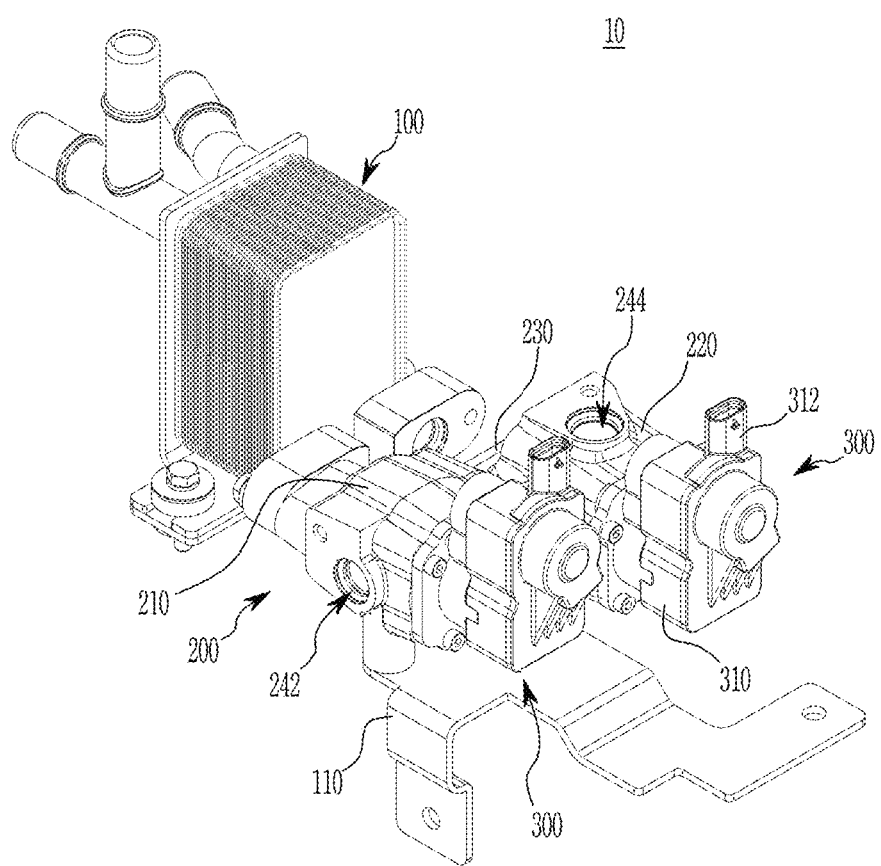
FIG. 1 is a perspective view illustrating a refrigerant module for a vehicle according to an embodiment of the present disclosure.

Hereinafter, embodiments of the present disclosure are described in detail with reference to the accompanying drawings.

Beforehand, it should be understood that the embodiments described herein based on the configurations illustrated in the drawings are merely example embodiments of the present disclosure and do not represent all of the technical spirit of the present disclosure. Thus, the present disclosure covers various equivalents and modifications that can replace the example embodiments of the present disclosure at the time of filing the present application.

In order to clearly describe technical concepts of the present disclosure, parts not relevant to the description have been omitted. Also, like or similar components are denoted by the same reference signs throughout the specification.

Since the size and thickness of each component shown in the drawings are arbitrarily shown for convenience of explanation, the present disclosure is not necessarily limited to what is illustrated in the drawings For example, the size or thickness may be exaggerated to clearly express various parts and regions.

Throughout the specification, when a certain part is referred to as "including" a certain component, this implies the inclusion of another component, rather than excluding another component, unless specified otherwise.

In addition, the terms such as "unit", "means", "part", or "member" used herein refer to a unit of a comprehensive configuration that performs at least one function or operation. When a component, device, element, or the like of the present disclosure is described as having a purpose or performing an operation, function, or the like, the component, device, or element should be considered herein as being "configured to" meet that purpose or perform that operation or function.

Figure 2:
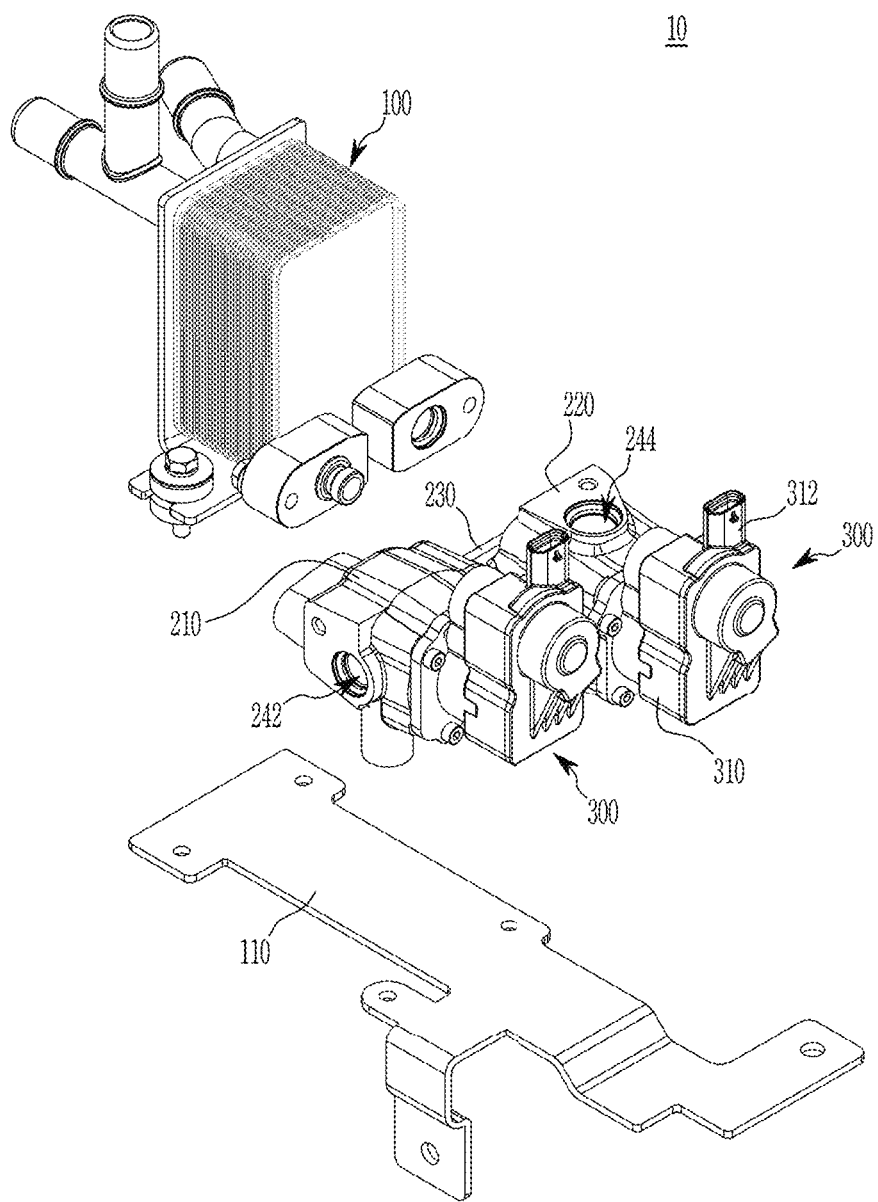
FIG. 2 an exploded perspective view illustrating the refrigerant module according to an embodiment of the present disclosure.
Figure 3:
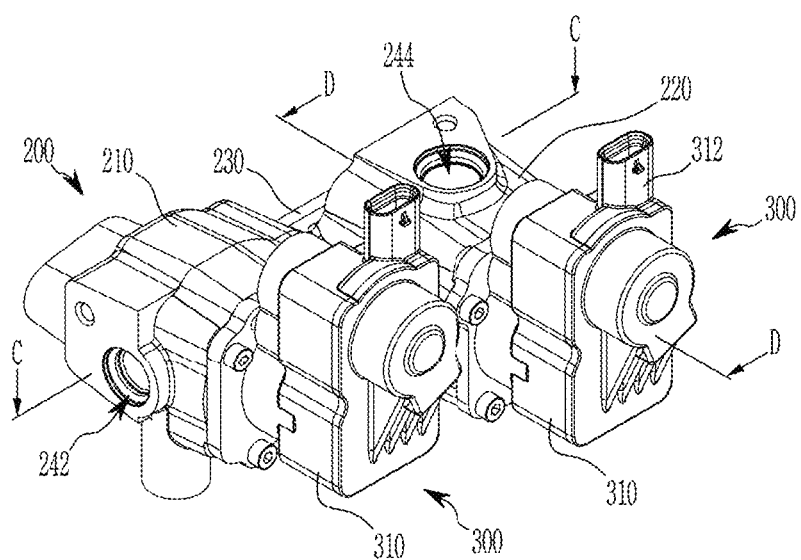
FIG. 3 is a perspective view illustrating a valve manifold and valve assemblies in the refrigerant module according to an embodiment of the present disclosure.
Figure 4:
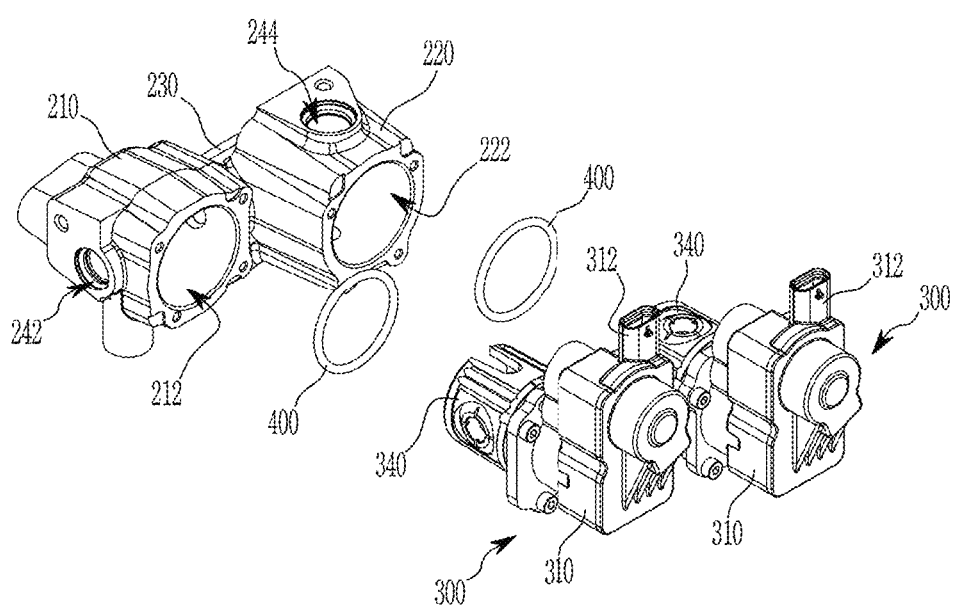
FIG. 4 is an exploded perspective view illustrating the valve manifold and the valve assemblies in the refrigerant module according to an embodiment of the present disclosure.
Figure 5:
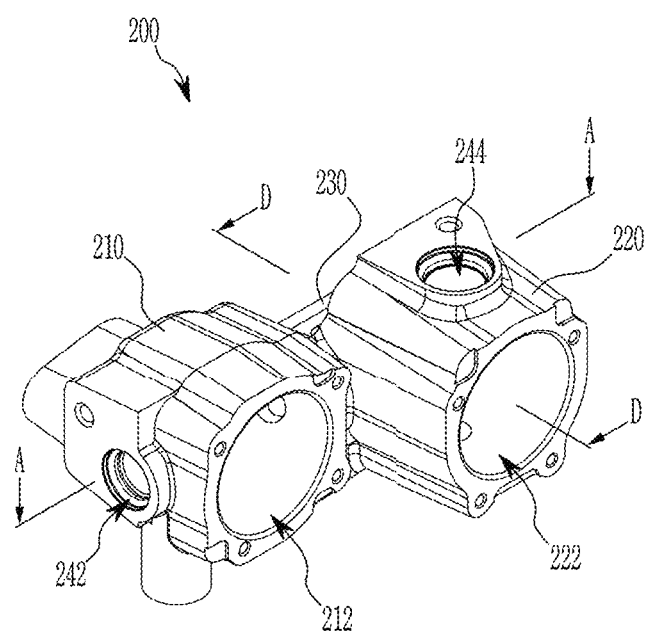
FIG. 5 is a perspective view illustrating the valve manifold applied to the refrigerant module according to an embodiment of the present disclosure.
Figure 6:
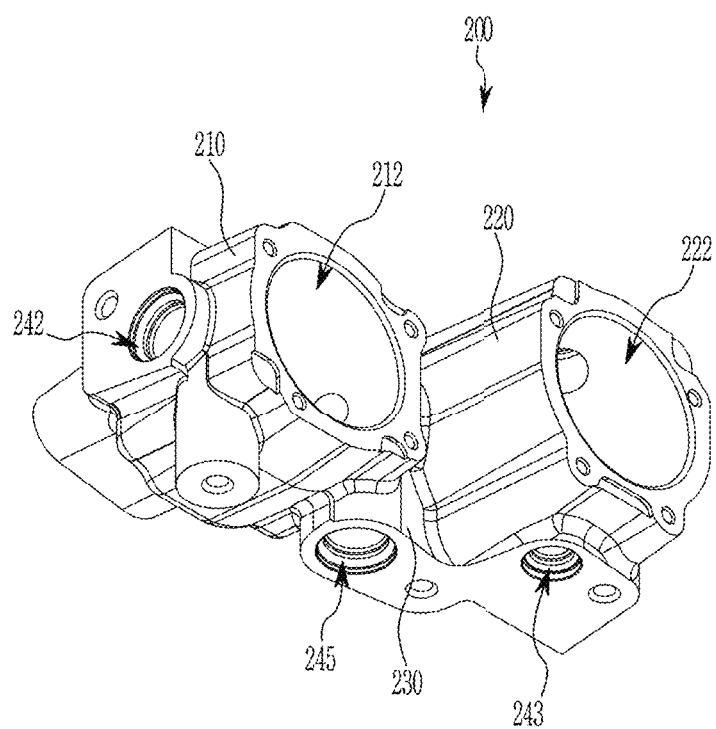
FIG. 6 is a rear perspective view illustrating the valve manifold applied to the refrigerant module according to an embodiment of the present disclosure.
Figure 7:
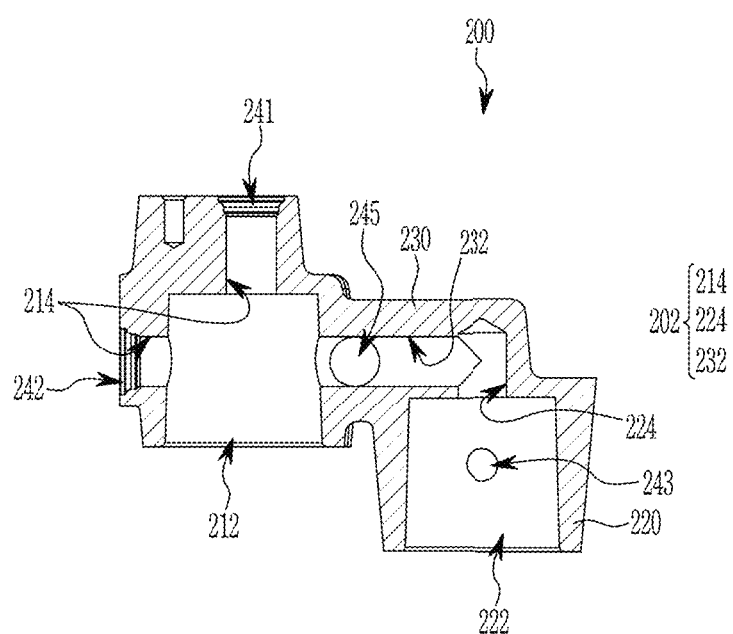
FIG. 7 is a cross-sectional view taken along line A-A of FIG. 5.
Figure 8:
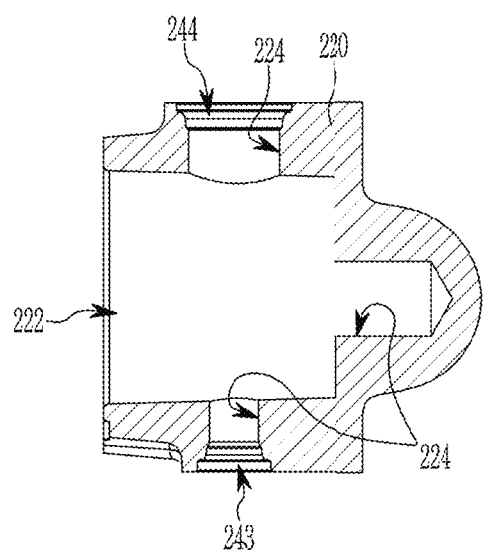
FIG. 8 is a cross-sectional view taken along line B-B of FIG. 5.
Figure 9:
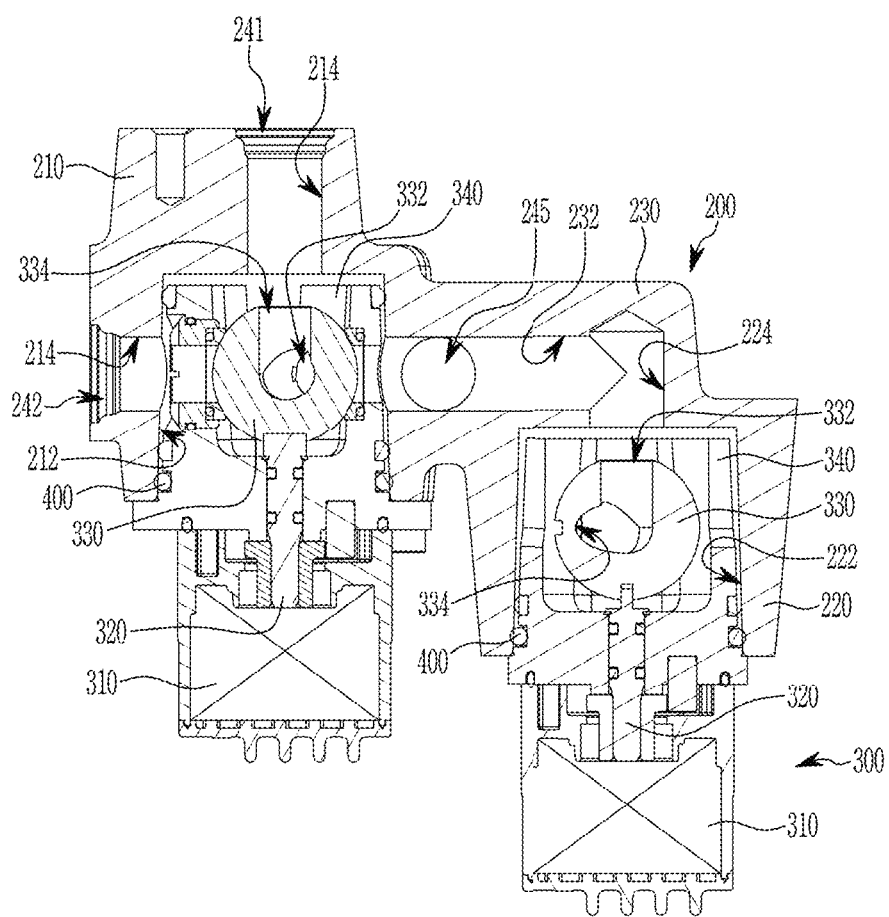
FIG. 9 is a cross-sectional view taken along line C-C of FIG. 3.
Figure 10:
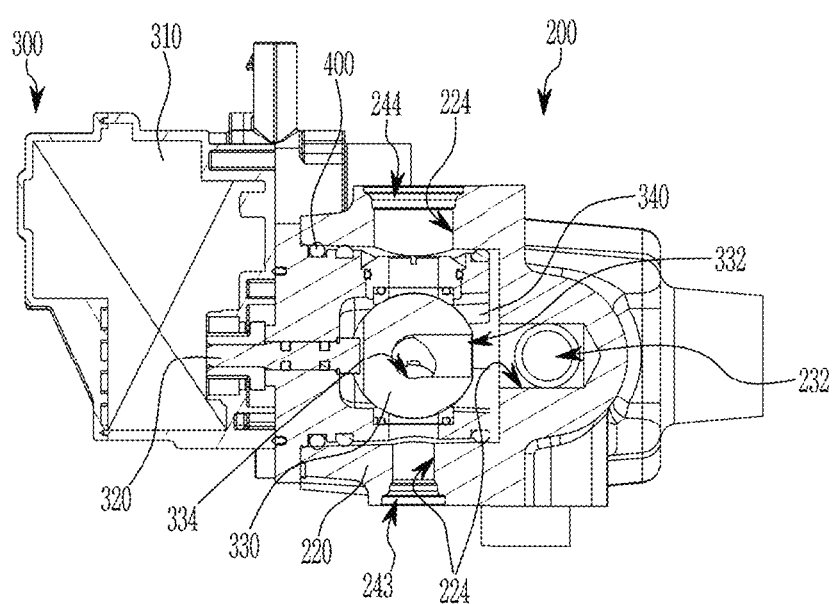
FIG. 10 is a cross-sectional view taken along line D-D of FIG. 3.

FIG. 1 is a perspective view illustrating a refrigerant module for a vehicle according to an embodiment of the present disclosure. FIG. 2 an exploded perspective view illustrating the refrigerant module according to an embodiment of the present disclosure. FIG. 3 is a perspective view illustrating a valve manifold and valve assemblies in the refrigerant module according to an embodiment of the present disclosure. FIG. 4 is an exploded perspective view illustrating the valve manifold and the valve assemblies in the refrigerant module according to an embodiment of the present disclosure. FIG. 5 is a perspective view illustrating the valve manifold applied to the refrigerant module according to an embodiment of the present disclosure. FIG. 6 is a rear perspective view illustrating the valve manifold applied to the refrigerant module according to an embodiment of the present disclosure. FIG. 7 is a cross-sectional view taken along line A-A of FIG. 5. FIG. 8 is a cross-sectional view taken along line B-B of FIG. 5. FIG. 9 is a cross-sectional view taken along line C-C of FIG. 3. FIG. 10 is a cross-sectional view taken along line D-D of FIG. 3.

Referring to the drawings, a refrigerant module 10 for a vehicle according to an embodiment of the present disclosure is simple to assemble with a reduced number of parts and is easy to maintain. These benefits are achieved by integrally forming or combining a plurality of valve assemblies 300 and a heat exchanger 100.

To this end, the refrigerant module 10 according to an embodiment of the present disclosure may include the heat exchanger 100, a bracket 110, a valve manifold 200, and the valve assemblies 300, as illustrated in FIGS. 1-4.

First, the heat exchanger 100 may exchange heat between a refrigerant introduced therein and a coolant, which is a working fluid.

The heat exchanger 100 may be configured as a plate-type heat exchanger in which multiple plates are stacked. In addition, flow paths through which the refrigerant and the coolant flow may be alternately formed inside the heat exchanger 100.

In other words, the heat exchanger 100 may be configured as a water-cooled heat exchanger in which the refrigerant and the coolant exchange heat.

The heat exchanger 100 and the valve manifold 200 are fixed to the bracket 110. The refrigerant module 10 may be mounted on a vehicle body through the bracket 110.

In the present embodiment, the valve manifold 200 is connected to the heat exchanger 100. A refrigerant flow path 202 may be formed and provided inside the valve manifold 200 to supply the supplied refrigerant to the heat exchanger 100 or to bypass the supplied refrigerant.

Here, as illustrated in FIGS. 5-8, the valve manifold 200 includes a first body 210, a first mounting groove 212, a second body 220, a second mounting groove 222, and a connection portion 230.

A first flow path 214 may be formed inside the first body 210.

The first mounting groove 212 may communicate with the first flow path 214. The first mounting groove 212 may be formed in the first body 210 so that one of the valve assemblies 300 is mounted therein.

In the present embodiment, a second flow path 224 may be formed inside the second body 220.

The second mounting groove 222 may communicate with the second flow path 224. The second mounting groove 222 may be formed in the second body 220 so that another one of the valve assemblies 300 is mounted therein. In one disclosed embodiment, the refrigerant module 10 includes two such valve assemblies 300.

In addition, a third flow path 232 may be formed inside the connection portion 230.

The connection portion 230 may be disposed between the first body 210 and the second body 220 to connect the first body 210 and the second body 220 to each other.

Here, the refrigerant flow path 202 may be formed and defined by the first flow path 214, the second flow path 224, and the third flow path 232 connected to each other inside the first body 210, the second body 220, and the connection portion 230, respectively.

The first body 210, the second body 220, and the connection portion 230, configured in this way, may be integrally formed.

The valve manifold 200 may be formed of either plastic or steel.

The valve manifold 200 may be manufactured through a manufacturing method including injection molding or casting, depending on the material used. Thus, the first body 210, the second body 220, and the connection portion 230 may be a unitary structure and integrally connected to each other.

Meanwhile, the valve manifold 200 may further include a plurality of refrigerant holes each communicating with the first mounting groove 212 or the second mounting groove 222. The refrigerant holes may be formed in the first body 210, the second body 220, or the connection portion 230 so that the refrigerant is introduced or discharged.

In the present embodiment, the plurality of refrigerant holes may include a first refrigerant hole 241, a second refrigerant hole 242, a third refrigerant hole 243, a fourth refrigerant hole 244, and a fifth refrigerant hole 245.

The first refrigerant hole 241 may communicate with the first mounting groove 212 through the first flow path 214. The first refrigerant hole 241 may be formed and provided in the first body 210 toward the heat exchanger 100.

Here, the first refrigerant hole 241 may be connected to the heat exchanger 100 so that the refrigerant is introduced into the heat exchanger 100.

The second refrigerant hole 242 may communicate with the first mounting groove 212 through the first flow path 214. The second refrigerant hole 242 may be formed and provided in the first body 210 toward a direction opposite to the second body 220. Accordingly, the second refrigerant hole 242 may be disposed in a direction perpendicular to the first refrigerant hole 241.

In other words, the first refrigerant hole 241 may be formed along a length direction of the first body 210. In addition, the second refrigerant hole 242 may be formed along a width direction of the first body 210.

In the present embodiment, the third refrigerant hole 243 may communicate with the second mounting groove 222 through the second flow path 224. The third refrigerant hole 243 may be formed and provided to be perpendicular to each of the first refrigerant hole 241 and the second refrigerant hole 242 in the second body 220.

The fourth refrigerant hole 244 may be formed and provided in the second body 220 to be disposed on the same line as the third refrigerant hole 243. The fourth refrigerant hole 244 may communicate with the second mounting groove 222 through the second flow path 224.

In other words, each of the third refrigerant hole 243 and the fourth refrigerant hole 244 may be formed and provided along a height direction of the second body 220.

In addition, the fifth refrigerant hole 245 may be formed and provided in the connection portion 230 in the same direction as the third refrigerant hole 243. The fifth refrigerant hole 245 may communicate with the third flow path 232.

Here, the refrigerant supplied to the valve manifold 200 may be selectively introduced into the second refrigerant hole 242 or the fifth refrigerant hole 245.

The refrigerant introduced into the valve manifold 200 through the second refrigerant hole 242 or the fifth refrigerant hole 245 may flow along the refrigerant flow path 202.

The refrigerant flowing in the refrigerant flow path 202 may be selectively discharged from the valve manifold 200 through the first refrigerant hole 241, the third refrigerant hole 243, or the fourth refrigerant hole 244, depending on the operation of the valve assemblies 300.

In addition, these valve assemblies 300 may be mounted on the valve manifold 200 to control the flow of the refrigerant flowing in the refrigerant flow path 202.

In the present embodiment, two valve assemblies 300 may be included to be mounted in the first mounting groove 212 of the first body 210 and the second mounting groove 222 of the second body 220, respectively.

Here, as illustrated in FIGS. 9 and 10, each valve assembly 300 may include an actuator 310, a shaft 320, a ball 330, and a seat housing 340.

The actuator 310 generates rotational power. The actuator 310 may include a connector 312 on one side thereof to connect a signal line and/or a power line for the actuator 310 thereto.

In the present embodiment, one end of the shaft 320 may be coupled to the actuator 310 to receive the rotational power transmitted from the actuator 310.

In other words, the actuator 310 may rotate the shaft 320 in a forward or reverse direction according to a control signal transmitted thereto with the power supplied thereto.

In the present embodiment, the ball 330 is coupled to the other end of the shaft 320. When the shaft 320 is rotated by the rotational power of the actuator 310, the ball 330 may rotate in the same direction as the shaft 320.

Here, the ball 330 may include an inlet passage 332 and an outlet passage 334.

The inlet passage 332 selectively communicates with the refrigerant flow path 202. The refrigerant may be introduced into the inlet passage 332.

The outlet passage 334 communicates with the inlet passage 332. The refrigerant introduced into the inlet passage 332 may be discharged through the outlet passage 334.

In other words, the refrigerant introduced into the valve manifold 200 through the second refrigerant hole 242 or the fifth refrigerant hole 245 is discharged through the outlet passage 334 via the inlet passage 332.

More specifically, when the ball 330 is rotated in the forward or reverse direction by the operation of the actuator 310, the refrigerant may be discharged through the outlet passage 334 via one or more of the first refrigerant hole 241, the third refrigerant hole 243, and/or the fourth refrigerant hole 244.

In addition, the seat housing 340 may rotatably accommodate the ball 330. The seat housing 340 may be coupled to the actuator 310.

Here, the seat housing 340 may be formed and provided to have a diameter that gradually decreases toward the valve manifold 200 from the actuator 310.

Accordingly, when the valve assembly 300 is mounted in the first mounting groove 212 or the second mounting groove 222, the seat housing 340 can be smoothly inserted in the first mounting groove 212 or the second mounting groove 222.

Meanwhile, in the present embodiment, a sealing member 400 may be interposed between the valve manifold 200 and the valve assembly 300.

The sealing member 400 is capable of preventing the refrigerant from leaking between the valve manifold 200 and the valve assembly 300.

Therefore, if the refrigerant module 10 according to an embodiment of the present disclosure is applied as described above, the refrigerant module 10 is simple to assemble with a reduced number of parts, and is easy to maintain, by integrally forming or combining the plurality of valve assemblies 300 with the heat exchanger 100 using the valve manifold 200.

In addition, according to the present disclosure, by mounting the plurality of valve assemblies 300 using the valve manifold 200 mounted on the heat exchanger 100 and including the refrigerant flow path 202 inside, it is possible to prevent a leakage of the refrigerant while minimizing the sealing member 400, thereby improving overall marketability.

In addition, according to the present disclosure, since the refrigerant flow path 202 formed in the valve manifold 200 is not sharply bent, it is possible to reduce a passage resistance, and it is possible to minimize the use of connecting pipes.

Furthermore, according to the present disclosure, by promoting simplification and modularization of components, it is possible to reduce the manufacturing cost and reduce the weight, and it is possible to improve, i.e., reduce, the space utilization.

As described above, while the present disclosure has been described with reference to limited example embodiments and drawings, it is to be understood that the present disclosure is not limited thereto. Various changes and modifications may be made by those of ordinary skill in the art, within the technical spirit of the present disclosure equivalent to the scope of the appended claims.

DESCRIPTION OF SYMBOLS

10: refrigerant module
100: heat exchanger
110: bracket
200: valve manifold
202: refrigerant flow path
210, 220: first and second bodies
212, 222: first and second mounting grooves
214, 224: first and second flow paths
230: connection portion
232: third flow path
241, 242, 243, 244, 245: first, second, third, fourth, and fifth refrigerant holes
300: valve assembly
310: actuator
320: shaft
330: ball
332: inflow passage
334: outlet passage
10) 340: seat housing
400: sealing member

What is claimed is:

1. A refrigerant module for a vehicle, the refrigerant module comprising:
   a heat exchanger configured to exchange heat between a refrigerant introduced therein and a working fluid;
   a valve manifold connected to the heat exchanger, the valve manifold having a refrigerant flow path formed inside to supply the refrigerant to the heat exchanger or to bypass the refrigerant; and
   a plurality of valve assemblies mounted on the valve manifold to control a flow of the refrigerant flowing in the refrigerant flow path,
   wherein the valve manifold includes a first body having a first flow path therein, a first mounting groove communicating with the first flow path and provided in the first body whereby a first valve assembly of the plurality of valve assemblies is mounted therein, a second body having a second flow path therein, a second mounting groove communicating with the second flow path and provided in the second body whereby a second valve assembly of the plurality of valve assemblies is mounted therein, and a connection portion disposed between the first body and the second body to connect the first body and the second body to each other, the connection portion having a third flow path therein inside, wherein the valve manifold further includes a plurality of refrigerant holes each communicating with the first mounting groove or the second mounting groove, the plurality of refrigerant holes formed in the first body, the second body, or the connection portion whereby the refrigerant is introduced or discharged, and wherein the plurality of refrigerant holes includes a first refrigerant hole communicating with the first mounting groove through the first flow path and provided in the first body toward the heat exchanger; and a second refrigerant hole communicating with the first mounting groove through the first flow path, provided in the first body toward a direction opposite to the second body, and disposed in a direction perpendicular to the first refrigerant hole.

2. The refrigerant module of claim 1, wherein the refrigerant flow path is formed by the first flow path, the second flow path, and the third flow path connected to each other inside the first body, the second body, and the connection portion.

3. The refrigerant module of claim 1, wherein the plurality of refrigerant holes further includes:

a third refrigerant hole communicating with the second mounting groove through the second flow path and provided to be perpendicular to each of the first refrigerant hole and the second refrigerant hole in the second body;

a fourth refrigerant hole provided in the second body to be disposed on the same line as the third refrigerant hole; and a fifth refrigerant hole provided in the connection portion in the same direction as the third refrigerant hole.

4. The refrigerant module of claim 3, wherein the refrigerant supplied to the valve manifold is selectively introduced into the second refrigerant hole or the fifth refrigerant hole.

5. The refrigerant module of claim 1, wherein the first refrigerant hole is connected to the heat exchanger.

6. The refrigerant module of claim 1, wherein the first body, the second body, and the connection portion are integrally formed.

7. The refrigerant module of claim 1, wherein the valve assembly includes:

an actuator configured to generate rotational power by applying a control signal thereto;

a shaft having one end and an opposite end, the one end coupled to the actuator to receive the rotational power transmitted from the actuator;

a ball coupled to the opposite end of the shaft and rotated by the rotational power of the actuator; and a seat housing rotatably accommodating the ball and coupled to the actuator.

8. The refrigerant module of claim 7, wherein the seat housing has a diameter that gradually decreases toward the valve manifold from the actuator.

9. The refrigerant module of claim 7, wherein the ball includes:

an inlet passage selectively communicating with the refrigerant flow path and allowing the refrigerant to be introduced therethrough; and an outlet passage communicating with the inlet passage and allowing the refrigerant introduced into the inlet passage to be discharged therethrough.

10. The refrigerant module of claim 1, further comprising:

a bracket to which the heat exchanger and the valve manifold are fixed.

11. The refrigerant module of claim 1, wherein a sealing member is interposed between the valve manifold and each of the plurality of valve assemblies.

* * * * *